No. 764,325. PATENTED JULY 5, 1904.
A. WINTON.
DOUBLE BRAKE FOR VEHICLES.
APPLICATION FILED JUNE 1, 1903.
NO MODEL. 2 SHEETS—SHEET 2.
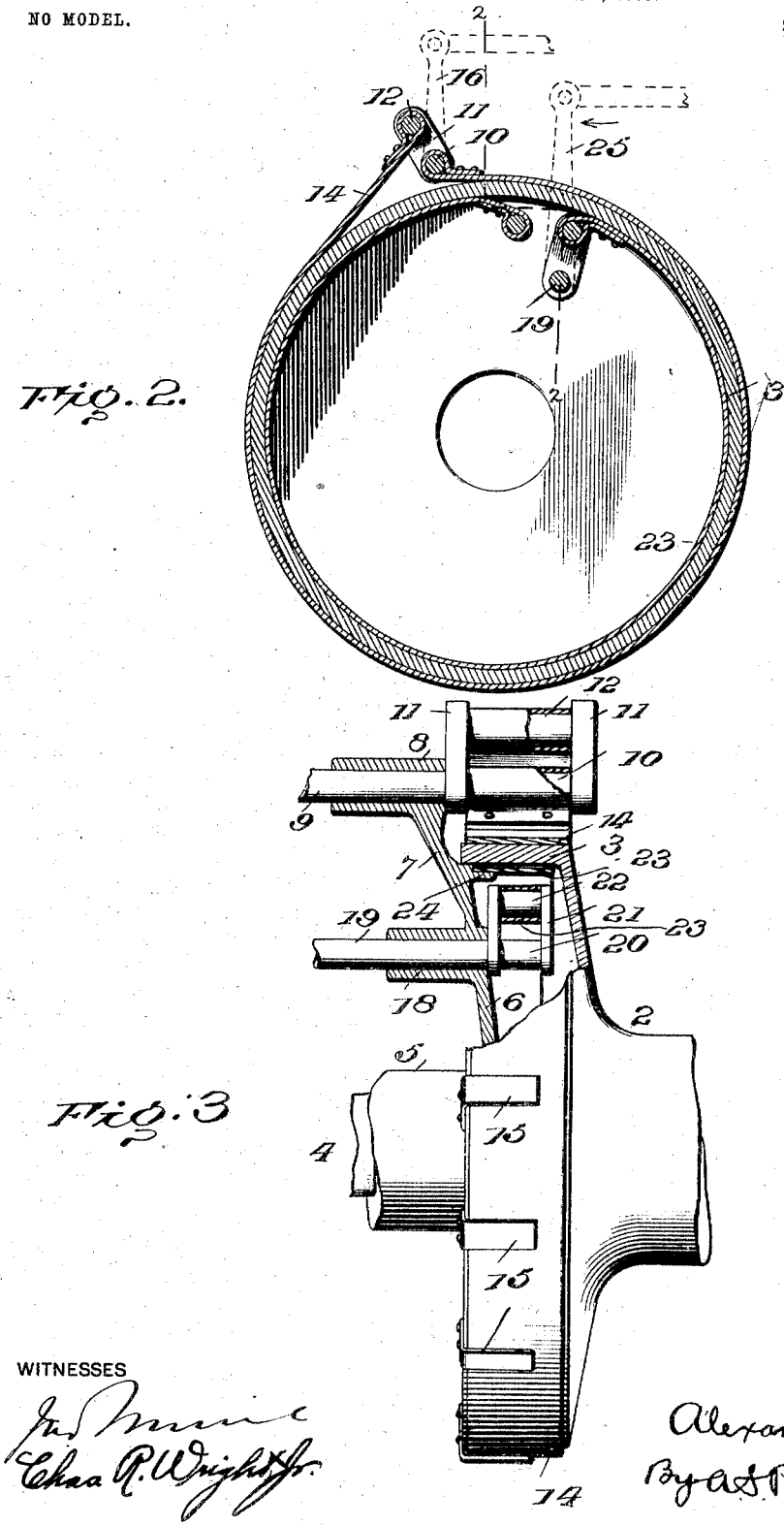
WITNESSES
INVENTOR
Alexander Winton
By A. S. Pattison
Atty No. 764,325. Patented July 5, 1904.

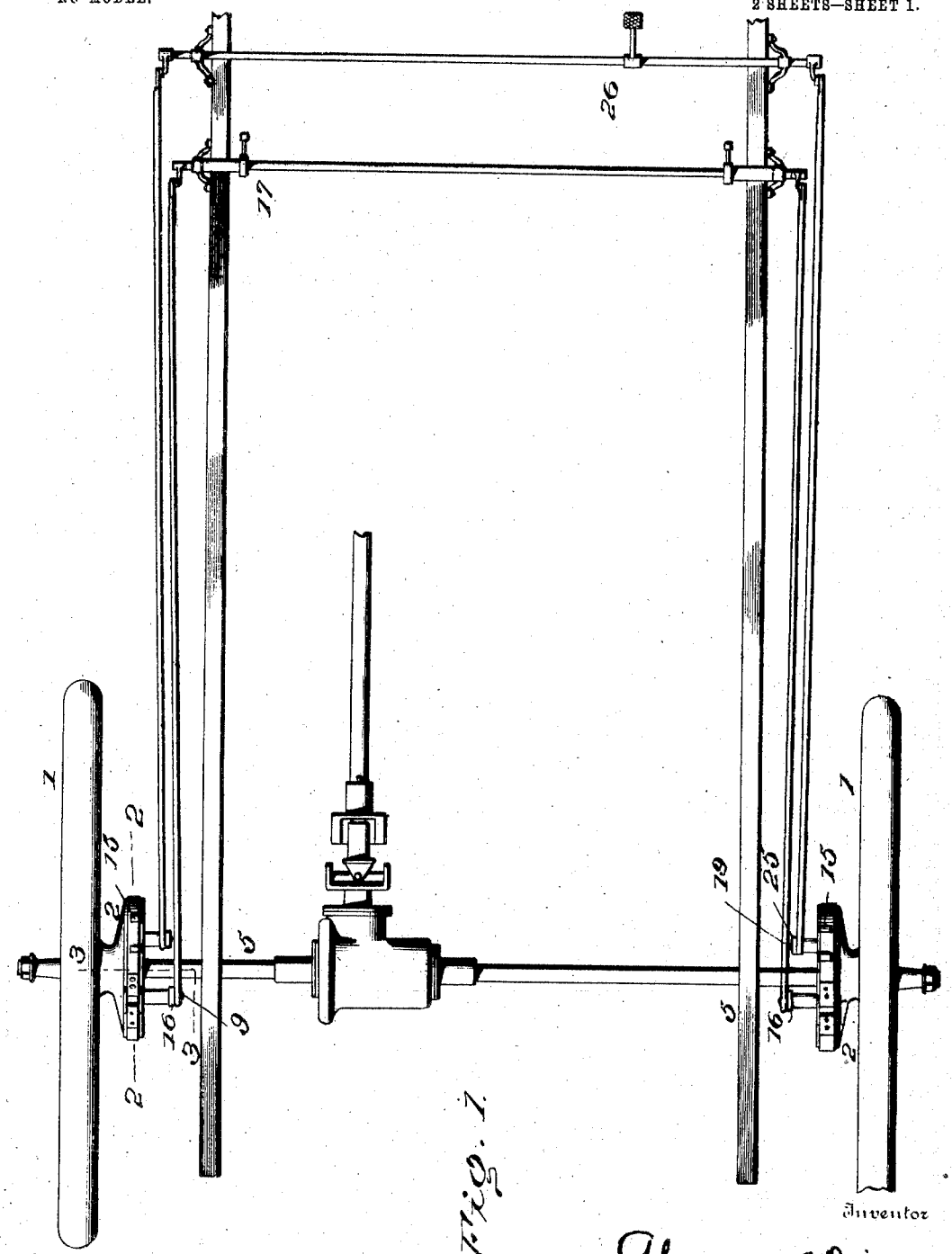

UNITED STATES PATENT OFFICE.

ALEXANDER WINTON, OF CLEVELAND, OHIO.

DOUBLE BRAKE FOR VEHICLES.

SPECIFICATION forming part of Letters Patent No. 764,325, dated July 5, 1904.

Application filed June 1, 1903. Serial No. 159,639. (No model.)

*To all whom it may concern:*

Be it known that I, ALEXANDER WINTON, a citizen of the United States, residing at Cleveland, in the county of Cuyahoga and State of Ohio, have invented new and useful Improvements in Double Brakes, of which the following is a specification.

My invention relates to improvements in double brakes, and is intended especially for use in connection with motor-vehicles; and it consists in the construction and arrangement of parts which will be fully set forth hereinafter.

In the accompanying drawings, Figure 1 is a top plan view of a portion of the frame of a motor-vehicle with my invention applied thereto. Fig. 2 is a section on the line 2 2 of Fig. 1. Fig. 3 is a vertical sectional view on the line 3 3 of Fig. 1.

As here shown, my brake is applied to the driving-wheels 1, the hubs of which are provided with the enlarged portions 2 at their inner ends, and these enlarged portions 2 are provided with lateral flanges 3. The flange 3 is therefore fast to its wheel 1 and rotates therewith, and the inner and outer sides of the flange 3 constitute braking-surfaces, as will be fully explained. The parts 2 and 3 may therefore be aptly termed the "rotating" member of my improved brake.

As here shown, there is a driving-shaft 4, and this driving-shaft is made fast in any suitable manner to the hubs of the wheels. Tubes or sleeves 5 surround the driving-shaft and are held against rotation by being connected with the vehicle usually through the intervention of suitable springs between the sleeves 5 and the vehicle-frame. Secured to the outer ends of the sleeves are the stationary members 6 of my improved brake, and these members 6 are preferably brazed to the sleeves 5, though they may be otherwise rigidly connected thereto.

In motor-vehicles it is very essential that an adequate and reliable braking system be provided, and this system or some part of it should be adapted to act upon the wheels or their connected parts, whereby should the connection between the wheels and the motor mechanism become broken the brake can be applied to control the vehicle independent of said mechanism, and this brake should be of a powerful character and, furthermore, should not depend upon any single braking device.

By means of my invention two separately-operated brakes are applied to a single rotating braking member, which owing to their relative arrangement are found to meet all the conditions requiring a brake for motor-vehicles.

The stationary member 6 has an arm 7, which projects beyond the periphery of the flange 3, and this arm carries a bearing 8, which extends in a direction transverse the flange 3. Journaled in this bearing 8 is a rod or shaft 9, the outer end 10 of which projects over the flange 3 and carries rigidly therewith the ears or arms 11, and connecting the ends of these arms is a pin 12. A normally expanding band-brake 14 surrounds the flange 3 and is normally out of contact therewith. Ears or projections 15 extend from the stationary member 6 at suitable intervals over the outer brake-band 14 and serve to limit the expansion of the band-brake 14 and to hold it in its proper relation to the flange 3. One end of this band-brake 14 is made fast to the end 10 of the shaft 9, and its opposite end is made fast to the pin 12. While my brake is adapted to be used in connection with one wheel of the vehicle, I prefer to apply it to two wheels, as here shown, and therefore the rod or shaft 9 extends entirely across the vehicle and operates a similar brake in connection with both wheels. A crank-arm 16 is rigidly connected with the shaft 9, and a suitable connection passes therefrom to a lever 17 within reach of the operator. When the cranks 16 and 25 are moved in the direction opposite from that indicated by arrow in Fig. 2, the brake-band is contracted around the outer surface of the flange 3 and serves to act as a brake. A movement of the crank 16 releases the brake-band 14 and it expands out of contact with the surface of the flange 3.

A bearing 18 is carried by the member 6 and located at a point inside of the flange 3, and this bearing extends in a direction transverse the wheels 1. Journaled in the bearing 18 is a shaft 19, which has its outer end 20 extending outward to a point below the flange 3 and is provided with the laterally-extending arms 21, between the outer end of which is secured a pin 22. One end of a normally contracting brake-band 23 is secured to the projecting end 20 of the shaft 19, and the opposite end of this brake-band is secured to the pin 22. The stationary member 6 is provided with an inwardly-extending circumferential flange 24, which the said contracting band 23 normally grasps, whereby the flange serves to hold the brake-band in proper inoperative position in respect to the inner side of the flange 3. Shaft 19 extends across the vehicle the same as shaft 9 to operate the brake of similar construction in connection with the wheel at the opposite side of the vehicle. Projecting from the shaft 19 is a crank-arm 25, which is connected with a foot-lever 26, located for the operation of the operator. When the lever 25 is moved in the direction opposite from that indicated by arrow in Fig. 2, the brake 23 is expanded and caused to engage the inner surface of the flange 3, and when moved in the opposite direction the brake-band 23 normally contracts and is thereby carried out of contact with the flange 3.

A brake constructed as here shown and acting upon opposite sides of the flange 3 is found to be powerful and reliable. Both brakes can be applied at the same time should necessity require it and can be separately operated under normal conditions. Inasmuch as one is operated by the foot and the other by the hand of the operator, both brakes can be instantly and simultaneously applied in an emergency. Furthermore, the brakes being adapted to operate independently should one become broken the other is serviceable. In the construction here shown brakes are applied simultaneously to wheels at opposite sides of the vehicle.

Having thus described my invention, what I claim as new, and desire to secure by Letters Patent, is—

1. In a vehicle-brake, the combination of a vehicle-body, a vehicle-wheel provided with a concentrically-arranged braking-flange at its inner side, braking-bands located at opposite sides of the said flange, a laterally-projecting member connected with the vehicle-body and held against movement, an operating member carried by the stationary member and operatively connected with the outer band, and an independent operating member located at the inner side of the said flange and carried by the laterally-extending member and operatively connected with the inner brake-band.

2. In a vehicle-brake, the combination of a vehicle-body, a transversely-arranged sleeve connected with the vehicle and held against rotation, a concentrically-arranged lateral braking-flange carried by and located at the inner side of a vehicle-wheel, an axle passing through the sleeve and projecting therefrom and carrying the said wheel, braking-bands located at opposite sides of the said flange, a laterally-projecting member carried by the sleeve, an operating member carried by the stationary member and extending outside of the flange and operatively connected with the outer band, and an independent operating member located at the inner side of the flange and carried by the laterally-extending member and operatively connected with the inner braking-band.

3. In a vehicle-brake, the combination of a vehicle, a transversely-arranged sleeve connected with the vehicle and held against rotation, an axle passing through the sleeve and projecting beyond the end thereof, a wheel carried by the projecting end of the axle, a concentrically and laterally arranged flange connected with and located at the inner side of the wheel, a laterally-projecting member rigidly connected with the sleeve and located adjacent the flange, the said laterally-projecting member provided with shaft-bearings located respectively in horizontal planes inside and beyond the said flange, brake-bands located respectively inside and outside of the flange, and operating members journaled in said bearings and projecting inside and outside of the flange and operatively connected respectively with the said inner and outer bands.

In testimony whereof I have hereunto set my hand in the presence of two subscribing witnesses.

ALEXANDER WINTON.

Witnesses:
 THOS. HENDERSON,
 GEO. H. BROWN.